US008767285B2

(12) United States Patent
Magri et al.

(10) Patent No.: US 8,767,285 B2
(45) Date of Patent: Jul. 1, 2014

(54) METHOD AND APPARATUS FOR CHANNEL POWER DEPLETION COMPENSATION FOR HYBRID DISTRIBUTED RAMAN AMPLIFIER-ERBIUM DOPED FIBER AMPLIFIER

(75) Inventors: Roberto Magri, Parma (IT); Gianmarco Bruno, Genova (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 372 days.

(21) Appl. No.: 13/123,890

(22) PCT Filed: Oct. 23, 2008

(86) PCT No.: PCT/EP2008/064395
§ 371 (c)(1),
(2), (4) Date: Jul. 10, 2011

(87) PCT Pub. No.: WO2010/045981
PCT Pub. Date: Apr. 29, 2010

(65) Prior Publication Data
US 2011/0255151 A1  Oct. 20, 2011

(51) Int. Cl.
*H04B 10/12* (2006.01)
*H04B 10/17* (2006.01)
*H01S 3/30* (2006.01)

(52) U.S. Cl.
USPC ........................................ 359/334; 359/341.4

(58) Field of Classification Search
USPC ............................................ 359/334, 341.4
See application file for complete search history.

(56) References Cited

U.S. PATENT DOCUMENTS

| 6,388,801 | B1* | 5/2002 | Sugaya et al. | 359/334 |
|---|---|---|---|---|
| 6,466,362 | B1* | 10/2002 | Friedrich | 359/334 |
| 6,577,437 | B2* | 6/2003 | Sugaya et al. | 359/334 |
| 6,760,150 | B2* | 7/2004 | Goto et al. | 359/337.12 |
| 6,873,455 | B2* | 3/2005 | Sugaya et al. | 359/334 |
| 2003/0076578 | A1* | 4/2003 | Goto et al. | 359/337.4 |
| 2004/0190123 | A1 | 9/2004 | Nakamura et al. | |
| 2005/0270634 | A1 | 12/2005 | Krummrich | |

FOREIGN PATENT DOCUMENTS

| EP | 1 215 527 A1 | 6/2002 |
|---|---|---|
| EP | 1 229 381 A1 | 8/2002 |

OTHER PUBLICATIONS

PCT International Search Report, mailed Jul. 9, 2009, in connection with International Application No. PCT/EP2008/064395.

* cited by examiner

*Primary Examiner* — Eric Bolda
(74) *Attorney, Agent, or Firm* — Leffler Intellectual Property Law, PLLC

(57) ABSTRACT

A method of compensating for channel power depletion induced by Raman amplification noise in a hybrid distributed Raman amplifier-Erbium doped fiber amplifier. In the method, an equivalent noise figure is determined for a virtual amplifier equivalent to the hybrid distributed Raman amplifier-Erbium doped fiber amplifier, and having an input power equal to the input power of the Erbium doped fiber amplifier when the distributed Raman amplifier is off and an output power equal to the Erbium doped fiber amplifier output power. A compensation power, dependent at least in part upon the equivalent noise figure, is determined. A control signal is provided for controlling the hybrid amplifier such that an optical signal amplified by the hybrid amplifier has a total output power equal to a predetermined nominal output power plus the compensation power.

19 Claims, 6 Drawing Sheets

(a)

Raman-EDFA (b)

METHOD AND APPARATUS FOR CHANNEL POWER DEPLETION COMPENSATION FOR HYBRID DISTRIBUTED RAMAN AMPLIFIER-ERBIUM DOPED FIBER AMPLIFIER

TECHNICAL FIELD

The invention relates to a method of compensating for channel power depletion induced by Raman amplification noise in a hybrid distributed Raman amplifier-Erbium doped fibre amplifier, a controller for a hybrid distributed Raman amplifier-Erbium doped fibre amplifier, and an optical network amplifier node.

BACKGROUND

In optical communication networks, the transmission of multi-channel optical signals over long distances (100 km+) requires the use of optical amplifiers to boost the optical power of the signals, to compensate for signal attenuation experienced during transmission. The gain of each optical amplifier is typically controlled by monitoring the total power of the input signal and output signal of the optical amplifier, and comparing the total output signal power to a predetermined nominal (ideal) total output power. Operation of each optical amplifier is controlled such that the total output power is substantially equal to the nominal total output power. The nominal total output power is the sum of the target optical power for each channel in the multi-channel signal and is determined based on the design requirements of an optical link or network. During the amplification process, the optical amplifiers introduce noise into the multi-channel optical signal and the noise power is measured within the monitored total output power from an amplifier. Therefore, when a multi-channel optical signal is amplified to have a total power equal to the nominal total power, the actual power of each channel is less than the target power because part of the monitored total output power is actually noise and not signal power. The resulting drop in the channel power below the target power is known as channel power depletion.

Common optical amplifiers for the optical transport infrastructure are Erbium doped fibre amplifiers (EDFA) and distributed Raman (Raman) amplifiers. Raman amplifiers are usually used in conjunction with EDFAs in a broad range of applications whose extremes are single-span very long links and ultra-long haul links. The issue of optimally controlling optical network amplifier nodes made of hybrid Raman-EDFA to counteract channel power depletion caused by Raman noise accumulation becomes critical in current reconfigurable transport networks where long and short spans are arbitrarily mixed and the longest all-optical connections must be enabled.

A solution to counteract channel power depletion caused by Raman noise has been proposed in US 20040190123 A1 which accounts for the Raman noise by directly measuring it with a photodiode. However, to do this requires the remote switching off of the traffic channels, complicating the setting up procedure and requiring a coordinated process with remote control. Furthermore, if the Raman gain is required to be changed, for example by changing the pump source power or to adjust the balance between Raman and EDFA gains (manually or through automatic gain controls), then the noise measurement must be redone and this is traffic affecting.

SUMMARY

It is an object to provide an improved method of compensating for channel power depletion induced by Raman amplification noise in a hybrid distributed Raman amplifier-Erbium doped fibre amplifier. It is a further object to provide an improved optical network amplifier node.

According to a first aspect of the invention there is provided a method of compensating for channel power depletion induced by Raman amplification noise in a hybrid distributed Raman amplifier-Erbium doped fibre amplifier. In the method, the hybrid distributed Raman amplifier-Erbium doped fibre amplifier is considered as an equivalent virtual amplifier having an input power equal to the input power of the Erbium doped fibre amplifier when the distributed Raman amplifier is off and an output power equal to the Erbium doped fibre amplifier output power. An equivalent noise figure for the virtual amplifier is determined. A compensation power dependent at least in part upon the equivalent noise figure is then determined. A control signal is then provided for controlling the hybrid amplifier such that an optical signal amplified by the hybrid amplifier has a total output power equal to a predetermined nominal output power plus the compensation power.

The method enables the use of hybrid Raman-EDFA amplification in multi-span links without loss of performance due to channel power depletion induced by Raman spontaneous emission noise.

The benefit of reducing channel power depletion is the preservation of the best OSNR (optical signal to noise ratio). Hence, an increase in the maximum reach of lightpaths which include a hybrid Raman-EDFA is obtained. A further benefit is that larger system margins can be allocated to cope with transmission impairments like polarisation mode dispersion (PMD), chromatic dispersion (CD), nonlinearities and fibre ageing. That is to say, the method enables a user to exploit the whole OSNR (without depletion penalties) to increase the system reach or to keep more system margins.

In addition, the method allows simple channel power setting at traffic nodes without the need to use sophisticated channel power equalization methods like OSNR pre-emphasis that require remote communication, as would be used in the prior art to counteract channel power depletion in a hybrid Raman/EDFA amplifier.

Preferably the control signal is for controlling the hybrid amplifier such that the compensating power is added by the Erbium doped fibre amplifier. In this way, whatever the hybrid Raman-EDFA amplifier design, and whatever the gain control or the gain balance strategy, the compensation power will be automatically adjusted.

The equivalent noise figure for the virtual amplifier may be determined from predetermined noise figures established for the distributed Raman amplifier and the Erbium doped fibre amplifier of the hybrid amplifier.

Preferably, the distributed Raman amplifier has a noise figure $NF_{Ram}$, the Erbium doped fibre amplifier has a noise figure $NF_{Edfa}$, the distributed Raman amplifier has Raman gain $G_{Ram}$, and the virtual amplifier has insertion losses $L_R$, and the equivalent noise figure ($NF_{EQ}$) is determined using the equation:

$$NF_{EQ} = NF_{Ram} + \frac{NF_{Edfa}}{G_{Ram}} L_R$$

The noise figure of the distributed Raman amplifier is preferably estimated from a Raman gain value using a predetermined relationship between Raman gain and noise. The analytical relationship between Raman gain and noise is preferably determined by numerical simulation and fitting the simulation with measurements.

The Raman gain value may be provided by a control unit of the distributed Raman amplifier.

The method therefore does not require any noise measurement because it relies on Raman noise estimation using a predetermined relationship between Raman gain and noise.

The noise figure of the Erbium doped fibre amplifier may be measured during its manufacture or subsequently and stored in a control unit of the Erbium doped fibre amplifier. Alternatively, the noise figure of the Erbium doped fibre amplifier may be obtained from a gain value of the Erbium doped fibre amplifier using a predetermined relationship between the noise figure and the gain of the Erbium doped fibre amplifier.

Preferably, the method further comprises determining a total equivalent noise bandwidth, and the compensation power is determined from the equivalent noise figure, the total equivalent noise bandwidth, the total Raman gain, the insertion losses and an input power at the Erbium doped fibre amplifier of an optical signal to be amplified.

The compensation power is preferably determined using the equation:

$$\Delta P = 10 \cdot \log 10 \left( 1 + \beta \cdot \frac{NF_{EQ} \cdot G/Lr}{P_{in\_e}} \right)$$

where $\beta$ depends upon the total equivalent noise bandwidth and $P_{in\_e}$ is the input power at the Erbium doped fibre amplifier of an optical signal to be amplified.

The compensation power is therefore managed in real-time by the Erbium doped fibre amplifier of the hybrid amplifier by monitoring its input power $P_{in\_e}$.

The total equivalent noise bandwidth is preferably estimated during design of the hybrid distributed Raman amplifier-Erbium doped fibre amplifier, and is most preferably in the range 32 nanometers to 34 nanometers. The total equivalent noise bandwidth can therefore be estimated during the design of the hybrid amplifier by proper fitting with experimental data and can then be maintained for the operational life of the hybrid amplifier, if desired.

Preferably, the Raman gain comprises net Raman gain.

Alternatively, the Raman gain may comprise gross Raman gain. The method may further comprise overestimating the equivalent noise bandwidth. Alternatively, the method may further comprise the following steps to determine a value for the total equivalent noise bandwidth:
 a. determine the equivalent noise figure using a gross Raman gain value;
 b. determine the compensation power;
 c. determine a net Raman gain value by subtracting the compensation power;
 d. determine the equivalent noise figure using the net Raman gain value;
 e. determine the compensation power;
 f. determine the total equivalent noise bandwidth.

Preferably, steps c. to e. are iterated at least twice.

The method may further comprise determining the net Raman gain by subtracting the compensation power from the gross Raman gain. This may be used to provide accurate manual setting of the Raman gain or to monitor the net Raman gain of the Raman amplifier.

According to a second aspect of the invention there is provided a controller for a hybrid distributed Raman amplifier-Erbium doped fibre amplifier. The controller comprises a processor arranged to determine an equivalent noise figure for a virtual amplifier equivalent to the hybrid distributed Raman amplifier-Erbium doped fibre amplifier, and having an input power equal to the input power of the Erbium doped fibre amplifier when the distributed Raman amplifier is off and an output power equal to the Erbium doped fibre amplifier output power. The processor is also arranged to determine a compensation power dependent at least in part upon the equivalent noise figure. The processor is further arranged to provide a control signal for controlling the hybrid amplifier such that an optical signal amplified by the hybrid amplifier has a total output power equal to a predetermined nominal output power plus the compensation power.

The processor may be arranged or configured to perform any of the above method steps.

According to a third aspect of the invention there is provided an optical network amplifier node. The optical network amplifier node comprises a hybrid distributed Raman amplifier-Erbium doped fibre amplifier. The optical network amplifier node further comprises optical signal power measurement apparatus configured to determine the power of an optical signal propagating to the input to the Erbium doped fibre amplifier. The optical network amplifier node additionally comprises an amplifier control system and a controller according to the second aspect of the invention, the controller being configured to provide a control signal to the amplifier control system. The amplifier control system is operable to control the optical network amplifier node such that an optical signal amplified by the amplifier node has a total output power equal to a predetermined nominal output power plus the compensation power.

The optical network amplifier node can be used in multi-span links without loss of performance due to channel power depletion induced by Raman spontaneous emission noise.

In addition, the optical amplifier node allows simple channel power setting at traffic nodes.

The amplifier control system preferably comprises an amplifier control and monitoring system comprising an Erbium doped fibre amplifier control and monitoring system and a distributed Raman amplifier control and monitoring system. The Erbium doped fibre amplifier control and monitoring system is preferably configured to receive compensation power information and to control the Erbium doped fibre amplifier to amplify an optical signal to have a total output power equal to a predetermined nominal output power plus the compensation power. Therefore, whatever the hybrid Raman-EDFA amplifier design, and whatever the gain control or the gain balance strategy, the optical amplifier node will operate to automatically adjust the compensation power.

The compensation power control system is preferably configured to receive optical signal power information from the optical power measurement apparatus.

According to a fourth aspect of the invention there is provided a computer programme product comprising programme code for performing any of the above method steps.

According to a fifth aspect of the invention there is provided a data carrier having computer readable instructions embodied therein for providing access to resources available on a controller for a hybrid distributed Raman amplifier-Erbium doped fibre amplifier. The computer readable instructions comprise instructions to cause the controller to perform any of the above method steps.

Embodiments of the invention will now be described in detail, by way of example only, with reference to the accompanying drawings.

DETAILED DESCRIPTION

A first embodiment of the invention provides a method 10 of compensating for channel power depletion induced by Raman amplification noise in a hybrid distributed Raman amplifier-Erbium doped fibre amplifier (Raman/EDFA), as shown in FIGS. 1 to 4.

Figure 6:
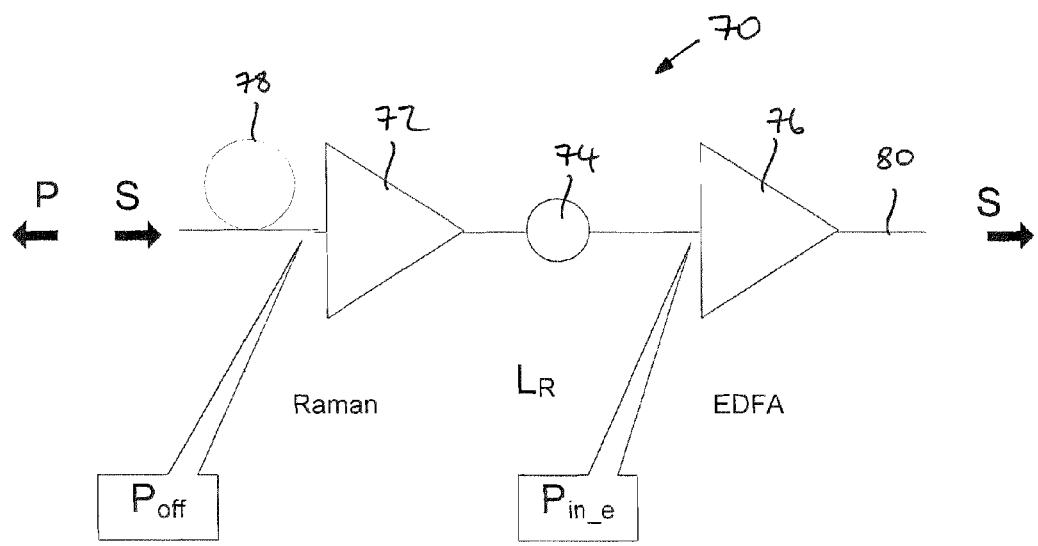
FIG. 6 is (a) a schematic basic representation of a hybrid Raman-Erbium doped fibre amplifier, and (b) an equivalent virtual amplifier according to the method of the first embodiment.
Figure 6:
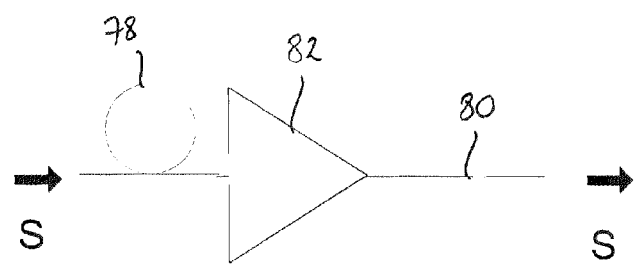

In the method of this embodiment, the Raman/EDFA 70, such as the one shown in FIG. 6(a), is considered as an equivalent virtual amplifier 82, as shown in FIG. 6(b), having an input power equal to the input power of the Erbium doped fibre amplifier when the distributed Raman amplifier is off ($P_{off}$) and an output power equal to the Erbium doped fibre amplifier output power ($P_{out\_e}$). An equivalent noise figure ($NF_{EQ}$) is determined for the virtual amplifier 12. A compensation power is then determined 14, this being an additional amount of optical power to be added to an optical signal being amplified by the Raman/EDFA in order to compensate for the effect of Raman noise in the total output power from the Raman/EDFA and thereby compensate for channel power depletion induced by Raman amplification noise. A control signal for the Raman/EDFA is then provided 16 for controlling the Raman/EDFA such that an optical signal amplified by the Raman/EDFA has a total output power equal to a predetermined nominal output power plus the compensation power.

Figure 1:
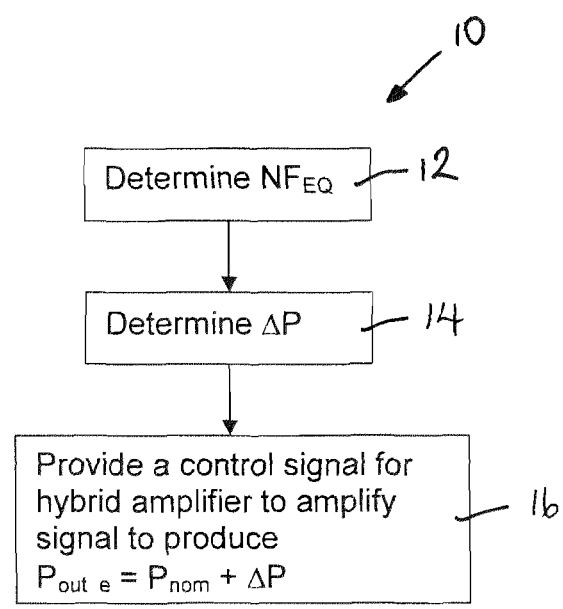
FIG. 1 is a flow chart of a method of compensating for channel power depletion induced by Raman amplification noise in a hybrid distributed Raman amplifier-Erbium doped fibre amplifier according to a first embodiment of the invention.
Figure 2:
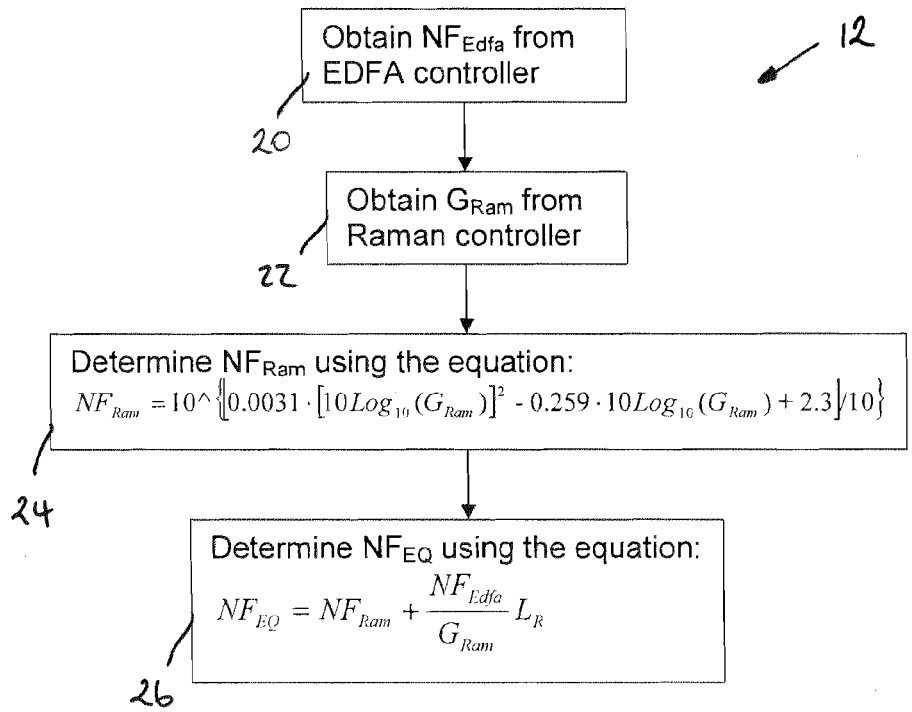
FIG. 2 is a flow chart of a first set of steps for calculating the equivalent noise figure $NF_{EQ}$ for the method of FIG. 1.

The equivalent noise figure ($NF_{EQ}$) may be determined using the method steps shown in FIG. 2, as follows. A noise figure ($NF_{Edfa}$) is obtained for the Erbium doped fibre amplifier (EDFA) of the Raman/EDFA, in this example from a controller of the EDFA. The $NF_{Edfa}$ can be easily obtained by measurement during manufacture of the EDFA, or can be subsequently experimentally assessed. It can be stored within an internal memory of the EDFA controller or within software code stored within the EDFA controller.

A Raman gain value ($G_{Ram}$) is obtained from a controller of the Raman amplifier of the Raman/EDFA. This may be gross Raman gain, i.e. the gain of the Raman amplifier plus Raman amplification noise added to the signal during amplification, or net Raman gain, i.e. the gain of the Raman amplifier without the Raman amplification noise. If gross Raman gain is used, further pre-steps are required to be added to the method, as described in detail below. The Raman gain may be obtained using known methods of Raman gain monitoring, which will be well known to the person skilled in the art and so are not described here.

A noise figure ($NF_{Ram}$) is determined 26 for the Raman amplifier using a predetermined relationship between $G_{Ram}$ and $NF_{Ram}$. In this example, the relationship takes the form of the following analytical relationship between $G_{Ram}$ and $NF_{Ram}$:

$$NF_{Ram}=10^{\{[0.0031\cdot[10\ Log_{10}(G_{Ram})]^2-0.259\cdot 10\ Log_{10}(G_{Ram})+2.3]/10\}}$$

This analytical relationship is determined from measurement and simulations, and different accuracy of fitting between the measurements and simulations may be used according to the design requirements of the Raman amplifier. The variation of this relationship with fibre type and channel number can be considered sufficiently weak in the gain range of typical multi span links (Raman gain in the 10-25 dB range) for it not to require recalculation for different fibre types and channel numbers.

It will be appreciated that the formula given above for determining $NF_{Ram}$ is just one example of a suitable relationship, and that different relationships can be analytically or experimentally obtained for use instead.

The predetermined relationship between $G_{Ram}$ and $NF_{Ram}$ may alternatively take the form of a look-up table containing predetermined related values of $G_{Ram}$ and $NF_{Ram}$.

The equivalent noise figure ($NF_{EQ}$) is determined using the equation:

$$NF_{EQ} = NF_{Ram} + \frac{NF_{Edfa}}{G_{Ram}}L_R$$

where $L_R$ 74 is the insertion loss due to optical passive components located between the point 98 at which Raman pump signals 88, 90 are coupled into the fibre 84 of the Raman amplifier 72 (i.e. the transmission fibre) and the input of the EDFA 76. The insertion loss may be determined during design of the Raman/EDFA and can be considered fixed since it undergoes little variability during operation, which causes negligible effects.

Figure 3:
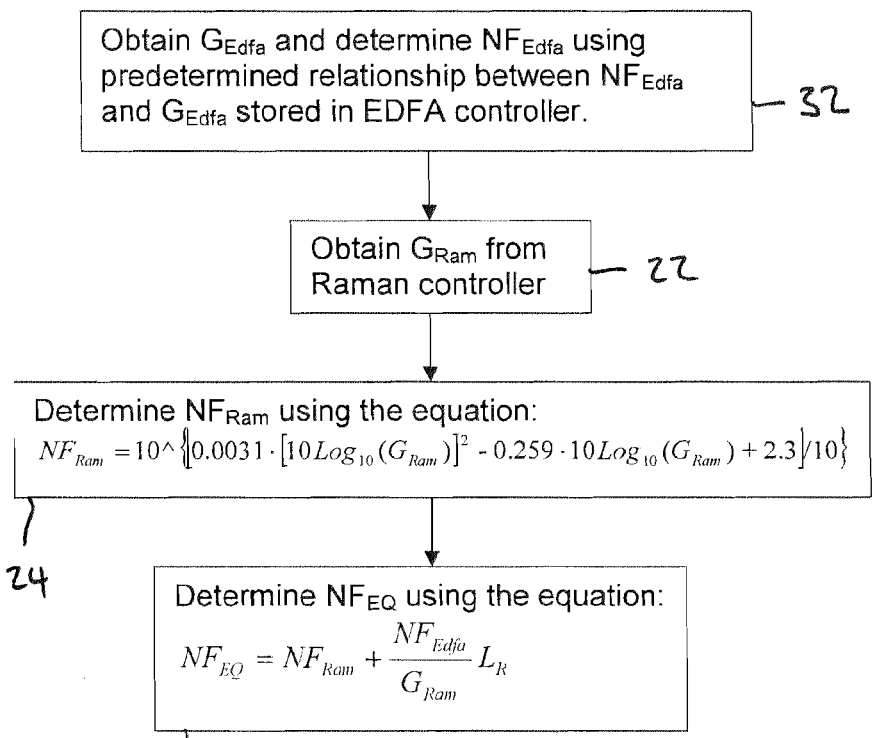
FIG. 3 is a flow chart of an alternative set of steps for calculating the equivalent noise figure $NF_{EQ}$ for the method of FIG. 1.

In an alternative embodiment, the equivalent noise figure ($NF_{EQ}$) may be determined using an alternative set of method steps shown in FIG. 3, as follows. These method steps are substantially the same as the method steps of FIG. 2, with the following modification. In this alternative embodiment, the EDFA noise figure ($NF_{Edfa}$) is obtained using a predetermined relationship between $NF_{Edfa}$ and EDFA gain ($G_{Edfa}$), in the form of an analytical relationship obtained by applying a linear fit between three calibration values of $NF_{Edfa}$ measured at three different values of $G_{Edfa}$. The $NF_{Edfa}$ calibration values are stored in the EDFA memory. Carrying out calibration measurements on each EDFA ensures that accurate $NF_{Edfa}$ values are obtained for each EDFA.

It will be appreciated that other forms of relationship between $NF_{Edfa}$ and $G_{Edfa}$ may alternatively be determined, such as a polynomial fit or an analytical expression.

The predetermined relationship may alternatively comprise a look-up table containing predetermined related values of $NF_{Edfa}$ and $G_{Edfa}$. The predetermined relationship is stored in a controller of the EDFA.

Figure 4:
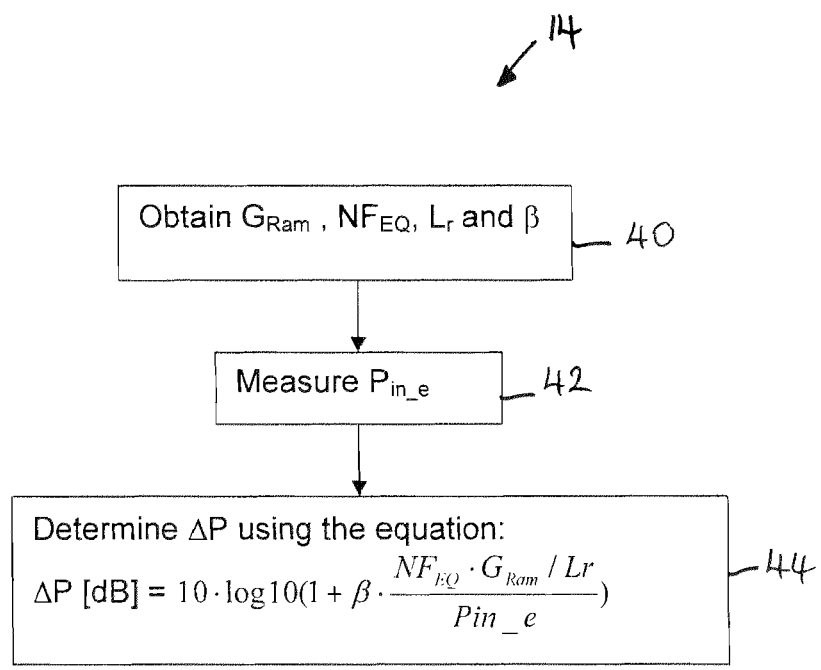
FIG. 4 is a flow chart of a set of steps for calculating the compensation power $\Delta P$ for the method of FIG. 1.

The compensation power (ΔP) is determined, as shown in FIG. 4, using the equation:

$$\Delta P[dB] = 10 \cdot \log 10 \left(1 + \beta \cdot \frac{NF_{EQ} \cdot G_{Ram}/L_R}{\text{Pin\_e}}\right)$$

$P_{in\_e}$ is the total input power to the EDFA, which is routinely monitored in all EDFAs and is readily available. The method of monitoring the total input power to the EDFA will be well known to the person skilled in the art and so will not be described in detail here.

β is given by the equation:

$$\beta = hf_0 B_N$$

where h is Planck's constant and $f_0$ is the frequency of the centre of the amplifier bandwidth, in this example 194 THz. $B_N$ is the total equivalent noise bandwidth of the Raman/EDFA, which can be estimated during design of the Raman/EDFA by applying a minimum square error fitting between experimental data and the model, and can then be taken to be fixed. In this example, a good fitting of experimental data was obtained for a $B_N$ of approximately 34 nm.

Once the gain of the Raman and EDFA have been fixed, the only variable in determining the compensation power is the total input power to the EDFA, therefore channel power depletion induced by Raman amplification noise can be managed in real time by the EDFA of the Raman/EDFA, by monitoring the total input power $P_{in\_e}$ to the EDFA and determining the compensation power accordingly.

The equation for the compensation power is obtained as follows.

The total noise power NT generated by a virtual hybrid Raman/EDFA amplifier whose average signal gain is Gs can be calculated as:

$$N_T = hf_0 B_N (Gs-1) NF_{EQ} \cong \beta \cdot Gs \cdot NF_{EQ} \quad (1)$$

Where:

$$\beta = hf_0 B_N \quad (2)$$

h is Planck's constant and $f_0$ is the frequency at the centre of the amplifier band (e.g. 194 THz). Therefore β depends only on the total equivalent noise bandwidth $B_N$.

The equivalent Noise Figure of the Raman/EDFA is given by $$NF_{EQ} = NF_{Ram} + \frac{NF_{Edfa}}{G_{Ram}} L_R \quad (3)$$

For the virtual hybrid amplifier a total signal gain Gs requires an output power $P_{OUT\_e}$ of:

$$P_{OUT\_e} = Gs \cdot P_{OFF} + N_T \quad (4)$$
$$= Gs \cdot P_{OFF} + \beta \cdot Gs \cdot NF_{EQ}$$
$$= Gs \cdot P_{OFF} + \beta \cdot Gs \cdot NF_{EQ}$$

The nominal $P_{OUT\_e}$ ($P_{OUT\_e\_nom}$) that would have been set neglecting Raman amplification noise generation would have been:

$$P_{OUT\_e\_nom} = Gs \cdot P_{OFF} \quad (5)$$

Therefore the power correction in dB can be evaluated by taking the log of the ratio $P_{OUT\_e}/P_{OUT\_e\_nom}$:

$$\Delta P[dB] = 10 \cdot \log 10 \left(1 + \beta \cdot \frac{NF_{EQ}}{P_{OFF}}\right) \quad (6)$$

in which $$P_{OFF} = \frac{\text{Pin\_e}}{G_{Ram}} Lr$$

The compensation power ΔP can therefore be re-written in the form:

$$\Delta P[dB] = 10 \cdot \log 10 \left(1 + \beta \cdot \frac{NF_{EQ} \cdot G_{Ram}/Lr}{\text{Pin\_e}}\right) \quad (7)$$

The compensation power ΔP can determined using either the gross gain of the Raman amplifier (i.e. the total gain applied to a signal including Raman amplifier noise) or using the net gain of the Raman amplifier (i.e. the signal gain without the amplifier noise). In the case of net Raman gain, the compensation power ΔP is determined as described above. In the case of gross Raman gain, additional method steps are required in order to determine an equivalent noise bandwidth figure, $B_N$, from which β is then determined, as follows.

In one method, the gross Raman gain is used to determine the equivalent noise figure $NF_{EQ}$ as described above, and the equivalent noise bandwidth $B_N$ is overestimated. Using gross Raman gain (which is higher than the net gain) gives a lower $NF_{EQ}$ value, and the effect of this is compensated for by increasing the equivalent noise bandwidth. In this example, an equivalent noise bandwidth of 34 nm is used instead of the correct 32 nm.

Figure 5:
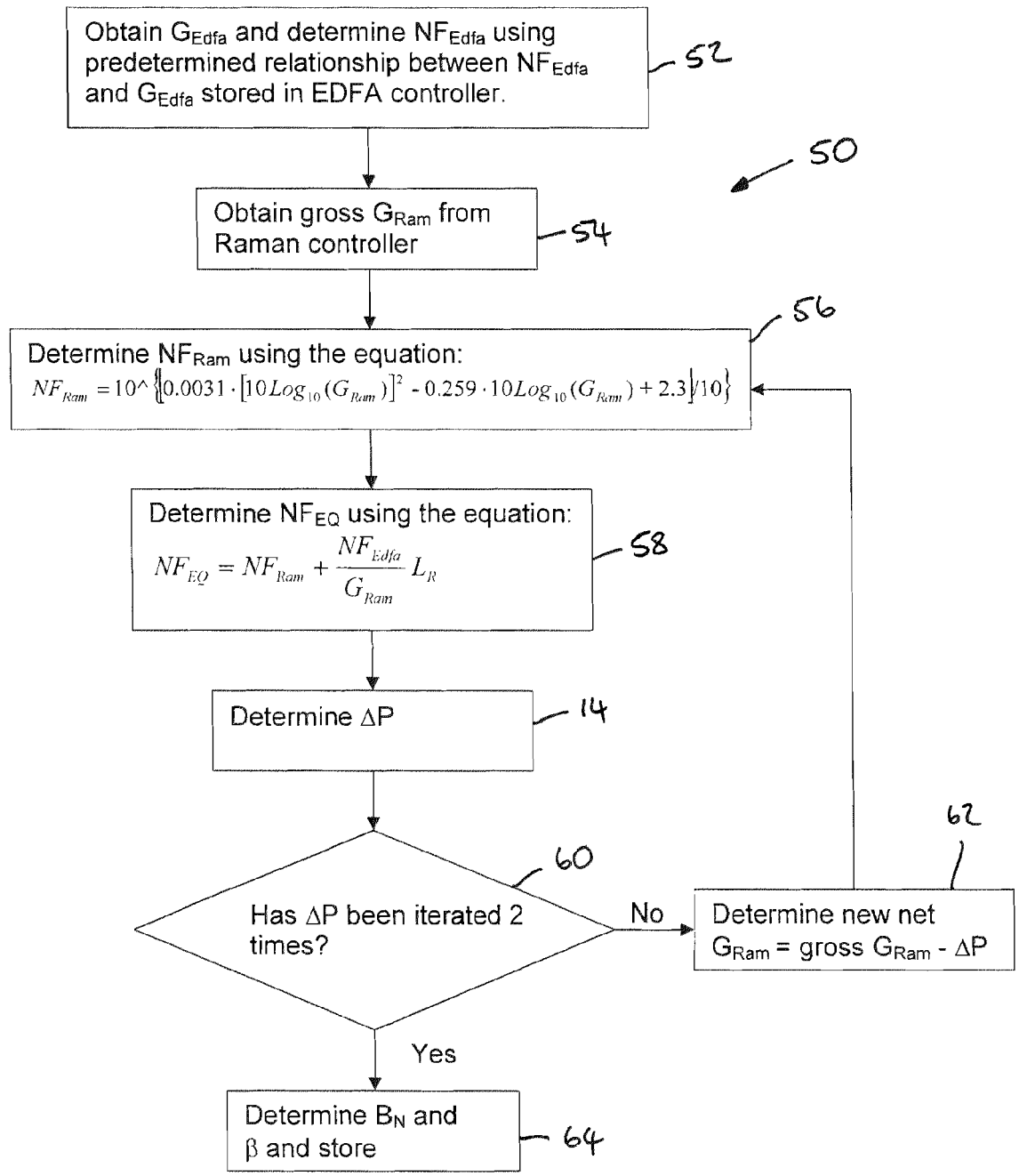
FIG. 5 is a flow chart of a set of steps which may be used to determine a total equivalent noise bandwidth for the method of FIG. 1.

In an alternative method, as shown in FIG. 5, the gross Raman gain is used to determine the equivalent noise figure $NF_{EQ}$ as described above, and an equivalent noise bandwidth $B_N$ is determined by iterating the calculations of the equivalent noise figure and the compensation power, as follows.

A gain value is obtained for the EDFA ($G_{Edfa}$) and a noise figure for the EDFA ($NF_{Edfa}$) is determined 52 using a pre-determined relationship between $G_{Edfa}$ and $NF_{Edfa}$, as described above. The $G_{Edfa}$ is obtained from a controller of the EDFA.

A gross $G_{Ram}$ value is obtained from the Raman controller 54, and $NF_{Ram}$ is determined using the analytical relationship given above 56.

$NF_{EQ}$ is determined 58 as described above and the compensation power ΔP is determined 14 as described above. A net $G_{Ram}$ value is then determined 62 by subtracting ΔP from the gross $G_{Ram}$. The net $G_{Ram}$ value is then used to determined a new value for $NF_{Ram}$ 56 and new values for $NF_{EQ}$ and ΔP are determined 58, 14. A second iteration is then carried out, determining a further set of values for net $G_{Ram}$ 62, $NF_{Ram}$ 56, $NF_{EQ}$ 58 and ΔP 14. Once ΔP has been iterated at least twice 60, the last value for ΔP is used to determine β and $B_N$, and these values are stored 64 for subsequent use in determining further ΔP values using the method steps described above.

Figure 7:
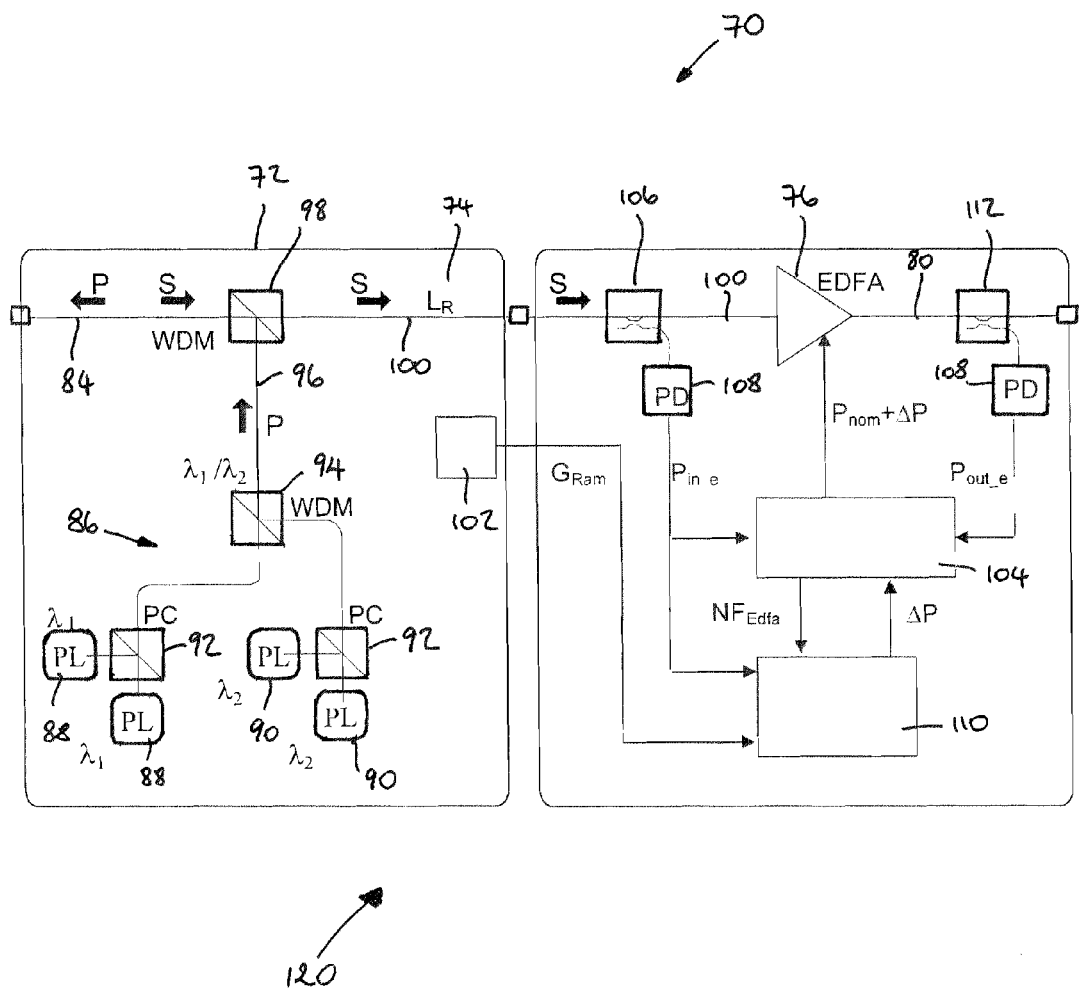
FIG. 7 is a schematic representation of an optical amplifier node according to a second embodiment of the invention.

A second embodiment of the invention provides an optical network amplifier node 120 as shown in FIG. 7.

The optical network amplifier node 120 comprises a hybrid distributed Raman amplifier-Erbium doped fibre amplifier (Raman/EDFA) 70, an amplifier control system 102, 104, optical signal power measurement apparatus 106, 108, and a controller 110.

The Raman/EDFA 70 comprises a distributed Raman (Raman) amplifier 72 and an Erbium doped fibre amplifier (EDFA) 76. The Raman amplifier 72 comprises an amplifier fibre, which in this example comprises a transmission line 84, and a Raman pump source 86. The Raman pump source 86 comprises two pump lasers (PL) 88 operating at a first wavelength $\lambda_1$ and two pump lasers 92 operating at a second wavelength $\lambda_2$. The optical outputs from the pump lasers 88, 92 are respectively coupled via pump couplers (PC) 92 and a wavelength division multiplexing signal combiner (WDM) 94, into a single pump signal (P) 96 which is coupled via a second WDM 98 into the transmission line 84, in a counter-propagating pumping configuration. It will be appreciated that other pumping arrangements may be used instead of the two-wavelength pumping arrangement described here, in particular a single pump wavelength may be used and a single pump source, or more than two pump wavelengths may be used, with any number of pump sources for each wavelength. The pump sources may be combined in a different manner to that described.

A signal (S) propagating through the optical amplifier node 120 is delivered from the Raman amplifier 72 to the EDFA 76 via a signal delivery fibre 100. Insertion losses $L_R$ due to passive optical components located between the location of Raman pump coupling into the transmission fibre 84 and the input of the EDFA 76 amplifier can be determined during the design of the Raman/EDFA 70 and can be considered fixed during the operation of the Raman/EDFA 70 due to their little variability which results in negligible effects.

The optical signal power measurement apparatus comprises a signal tap 106, provided in the delivery fibre 100 before the input to the EDFA 76, and a photodetector (PD) 108. The signal tap 106 taps out a fraction of the optical signal (S) received from the Raman amplifier 72, which is measured by the photodetector 108 and used to determine the optical power of the signal S at the input to the EDFA ($P_{in\_e}$). A second optical signal power measurement apparatus comprising a second signal tap 112 and a second photodetector 108 is provided in the output line 80 from the Raman/EDFA 70, and operates in the same manner to obtain a value for the output power from the EDFA 76 ($P_{out\_e}$).

The amplifier control system comprises a controller 102 for the Raman amplifier and a controller 104 for the EDFA.

The controller 110 comprises a processor arranged to determine an equivalent noise figure for a virtual amplifier equivalent to the Raman/EDFA 70. The virtual amplifier has an input power equal to the input power of the EDFA 76 when the Raman amplifier 72 is off and an output power equal to the EDFA 76 output power. The processor determines a compensation power dependent at least in part upon the equivalent noise figure and provides a control signal for controlling the Raman/EDFA 70 such that an optical signal amplified by the Raman/EDFA 70 has a total output power equal to a predetermined nominal output power plus the compensation power.

The processor is arranged to implement the method of the first embodiment. In this example, the processor comprises a microprocessor unit, including random access memory (RAM) in which computer readable instructions are embodied for providing access to resources available on the controller 110, the computer readable instructions comprising instructions to cause the controller 110 to perform the steps of the method of the first embodiment.

It will be appreciated that the processor may be implemented as a single processor or multiple processors, or as any digital or analogue circuit or processing unit or element, including a microprocessor as in this example.

The optical network amplifier node 120 enables an optical network to be contrasted in which the actual channel power to be maintained substantially equal to a desired nominal (target) channel power for any combination of node architecture (pure EDFA or hybrid Raman-EDFA) and span loss (from very short ~15 dB to very long ~50 dB) for the network planning is highly simplified.

The described embodiments enable the use of hybrid Raman-EDFA amplification in multi-span links without loss of performance due to channel power depletion induced by Raman spontaneous emission noise.

The benefit of reducing channel power depletion is the preservation of the best OSNR (optical signal to noise ratio). Hence, an increase in the maximum reach of lightpaths which include a hybrid Raman-EDFA is obtained. A further benefit is that larger system margins can be allocated to cope with transmission impairments like polarisation mode dispersion (PMD), chromatic dispersion (CD), nonlinearities and fibre ageing. That is to say, the method enables a user to exploit the whole OSNR (without depletion penalties) to increase the system reach or to keep more system margins.

In addition, the described method allows simple channel power setting at traffic nodes.

The described method does not require any noise measurement because it relies on Raman noise estimation by an analytic relationship between Raman gain and noise.

The compensating power to be added to the nominal power is applied by the EDFA section only of the local node. In this way, whatever the Raman/EDFA design and whatever the gain control or the gain balance strategy, the compensation power is able to be automatically adjusted.

The invention claimed is:

1. A method of compensating for channel power depletion induced by Raman amplification noise in a hybrid distributed Raman amplifier-Erbium doped fibre amplifier, the method comprising:
   determining an equivalent noise figure for a virtual amplifier equivalent to the hybrid distributed Raman amplifier-Erbium doped fibre amplifier, and having an input power equal to the input power of the Erbium doped fibre amplifier when the distributed Raman amplifier is off and an output power equal to the Erbium doped fibre amplifier output power;
   determining a compensation power dependent at least in part upon the equivalent noise figure; and
   providing a control signal for controlling the hybrid amplifier such that an optical signal amplified by the hybrid amplifier has a total output power equal to a predetermined nominal output power plus the compensation power,
   wherein the distributed Raman amplifier has a noise figure and the equivalent noise figure comprises the noise figure of the distributed Raman amplifier, and
   wherein the noise figure of the distributed Raman amplifier is estimated from a Raman gain value using a pre-determined relationship between only Raman gain and the noise figure of the distributed Raman amplifier.

2. A method as claimed in claim 1, wherein the control signal is for controlling the hybrid amplifier such that the compensating power is added by the Erbium doped fibre amplifier.

3. A method as claimed in claim 1, wherein the equivalent noise figure for the virtual amplifier is determined from a predetermined noise figure established for the Erbium doped fibre amplifier.

4. A method as claimed in claim 1, wherein the Erbium doped fibre amplifier has a noise figure $NF_{Edfa}$, the distributed Raman amplifier has Raman gain $G_{Ram}$, and the virtual amplifier has insertion losses $L_R$, and the equivalent noise figure is determined using the equation:

$$NF_{EQ} = NF_{Ram} + \frac{NF_{Edfa}}{G_{Ram}} L_R.$$

where:
$NF_{Ram}$ is the noise figure of the distributed Raman amplifier, and
$NF_{EQ}$ is the equivalent noise figure.

5. A method as claimed in claim 1, wherein the Raman gain value is provided by a control unit of the distributed Raman amplifier.

6. A method as claimed in claim 4, wherein the noise figure of the Erbium doped fibre amplifier is obtained from a gain value of the Erbium doped fibre amplifier using a predetermined relationship between the noise figure and the gain of the Erbium doped fibre amplifier.

7. A method as claimed in claim 4, wherein the method further comprises determining a total equivalent noise bandwidth, and the compensation power is determined from the equivalent noise figure, the total equivalent noise bandwidth, the Raman gain, the insertion losses and an input power at the Erbium doped fibre amplifier of an optical signal to be amplified.

8. A method as claimed in claim 7, wherein the compensation power $\Delta P$ is determined using the equation:

$$\Delta P = 10 \cdot \log 10 \left(1 + \beta \cdot \frac{NF_{EQ} \cdot G_{Ram}/Lr}{\text{Pin\_e}}\right)$$

where $\beta$ depends upon the total equivalent noise bandwidth and $P_{in\_e}$ is the input power at the Erbium doped fibre amplifier of an optical signal to be amplified.

9. A method as claimed in claim 8, wherein the total equivalent noise bandwidth is in the range 32 nanometers to 34 nanometers.

10. A method as claimed in claim 4, wherein the Raman gain comprises net Raman gain.

11. A method as claimed in claim 4, wherein the Raman gain comprises gross Raman gain and the method further comprises overestimating the equivalent noise bandwidth.

12. A method as claimed in claim 4, wherein the Raman gain comprises gross Raman gain and the method further comprises the following steps to determine a value for the total equivalent noise bandwidth:
 a. determining the equivalent noise figure using a gross Raman gain value;
 b. determining the compensation power;
 c. determining a net Raman gain value by subtracting the compensation power;
 d. determining the equivalent noise figure using the net Raman gain value;
 e. determining the compensation power; and
 f. determining the total equivalent noise bandwidth.

13. A method as claimed in claim 12, wherein steps c. to e. are iterated at least twice.

14. A controller for a hybrid distributed Raman amplifier-Erbium doped fibre amplifier, the controller comprising a processor arranged to:
 determine an equivalent noise figure for a virtual amplifier equivalent to the hybrid distributed Raman amplifier-Erbium doped fibre amplifier, and having an input power equal to the input power of the Erbium doped fibre amplifier when the distributed Raman amplifier is off and an output power equal to the Erbium doped fibre amplifier output power;
 determine a compensation power dependent at least in part upon the equivalent noise figure; and
 provide a control signal for controlling the hybrid amplifier such that an optical signal amplified by the hybrid amplifier has a total output power equal to a predetermined nominal output power plus the compensation power,
 wherein the distributed Raman amplifier has a noise figure and the equivalent noise figure comprises the noise figure of the distributed Raman amplifier, and
 wherein the noise figure of the distributed Raman amplifier is estimated from a Raman gain value using a pre-determined relationship between only Raman gain and the noise figure of the distributed Raman amplifier.

15. An optical network amplifier node comprising:
 a hybrid distributed Raman amplifier-Erbium doped fibre amplifier;
 an amplifier control system;
 optical signal power measurement apparatus configured to determine the power of an optical signal propagating to the input to the Erbium doped fibre amplifier; and
 a controller for a hybrid distributed Raman amplifier-Erbium doped fibre amplifier, the controller comprising a processor arranged to:
  determine an equivalent noise figure for a virtual amplifier equivalent to the hybrid distributed Raman amplifier-Erbium doped fibre amplifier, and having an input power equal to the input power of the Erbium doped fibre amplifier when the distributed Raman amplifier is off and an output power equal to the Erbium doped fibre amplifier output power;
  determine a compensation power dependent at least in part upon the equivalent noise figure; and
  provide a control signal for controlling the hybrid amplifier such that an optical signal amplified by the hybrid amplifier has a total output power equal to a predetermined nominal output power plus the compensation power,
 the controller being configured to provide a control signal to the amplifier control system,
 the amplifier control system being operable to control the optical network amplifier node such that an optical signal amplified by the amplifier node has a total output power equal to a predetermined nominal output power plus the compensation power,
 wherein the distributed Raman amplifier has a noise figure and the equivalent noise figure comprises the noise figure of the distributed Raman amplifier, and
 wherein the noise figure of the distributed Raman amplifier is estimated from a Raman gain value using a pre-determined relationship between only Raman gain and the noise figure of the distributed Raman amplifier.

16. An optical network amplifier node as claimed in claim 15, wherein the amplifier control system comprises an amplifier control and monitoring system comprising an Erbium doped fibre amplifier control and monitoring system and a distributed Raman amplifier control and monitoring system.

17. An optical network amplifier node as claimed in claim 16, wherein the Erbium doped fibre amplifier control and monitoring system is configured to receive compensation power information and to control the Erbium doped fibre amplifier to amplify an optical signal to have a total output power equal to a predetermined nominal output power plus the compensation power.

18. An optical network amplifier node as claimed in claim 15, wherein the compensation power control system is configured to receive optical signal power information from the optical power measurement apparatus.

19. A non-transitory data carrier having computer readable instructions embodied therein for providing access to resources available on a controller for a hybrid distributed Raman amplifier-Erbium doped fibre amplifier, the computer readable instructions comprising instructions to cause the controller to perform of compensating for channel power depletion induced by Raman amplification noise in a hybrid distributed Raman amplifier-Erbium doped fibre amplifier, the method comprising:

determining an equivalent noise figure for a virtual amplifier equivalent to the hybrid distributed Raman amplifier-Erbium doped fibre amplifier, and having an input power equal to the input power of the Erbium doped fibre amplifier when the distributed Raman amplifier is off and an output power equal to the Erbium doped fibre amplifier output power;

determining a compensation power dependent at least in part upon the equivalent noise figure; and providing a control signal for controlling the hybrid amplifier such that an optical signal amplified by the hybrid amplifier has a total output power equal to a predetermined nominal output power plus the compensation power, wherein the distributed Raman amplifier has a noise figure and the equivalent noise figure comprises the noise figure of the distributed Raman amplifier, and wherein the noise figure of the distributed Raman amplifier is estimated from a Raman gain value using a pre-determined relationship between only Raman gain and the noise figure of the distributed Raman amplifier.

* * * * *